W. Pimlott,
Harvester Rake.

No. 99,108.  Patented Jan. 25, 1870.

Witnesses:
William Stilwell
P. W. Kelly

William Pimlott

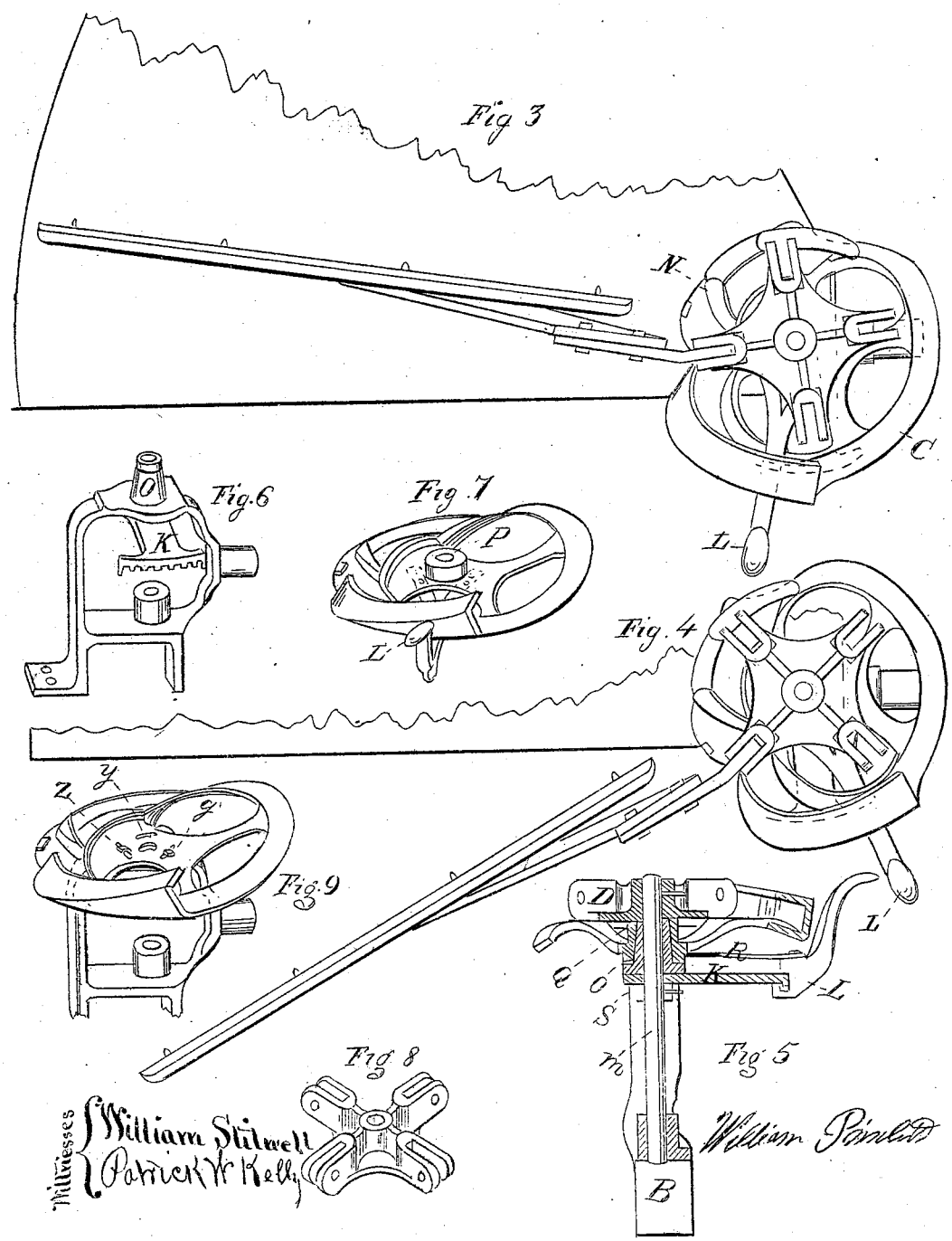

UNITED STATES PATENT OFFICE.

WILLIAM PIMLOTT, OF SPRINGFIELD, OHIO.

IMPROVEMENT IN HARVESTER-RAKES.

Specification forming part of Letters Patent No. 99,108, dated January 25, 1870.

*To all whom it may concern:*

Be it known that I, WILLIAM PIMLOTT, of Springfield, in the county of Clarke and State of Ohio, have invented a new and useful Improvement in Harvesters; and I do hereby declare the following to be a full, clear, and exact description of the same, reference being had to the accompanying drawings, in which—

Figure 1:
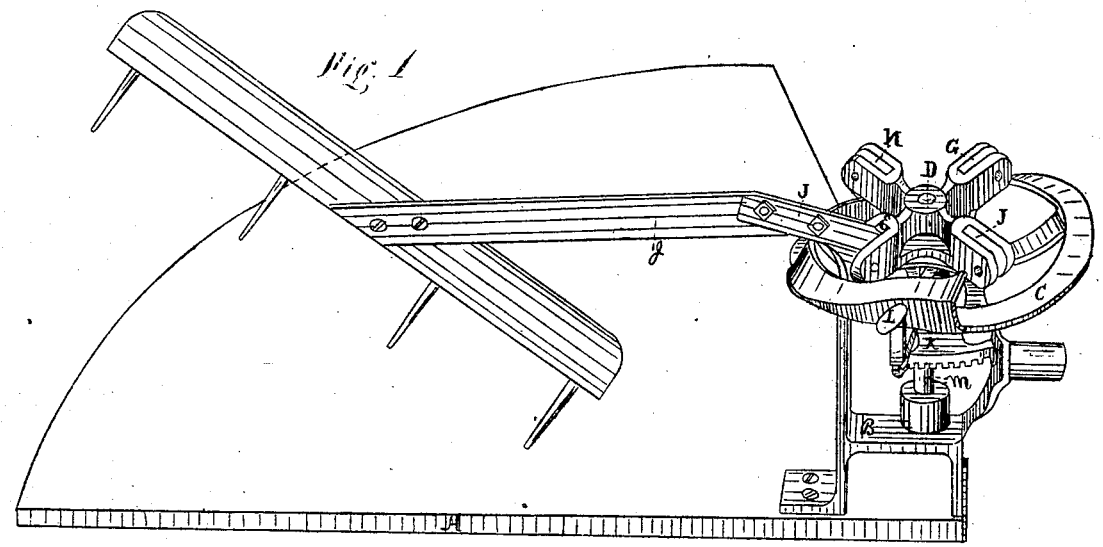
Figure 2:
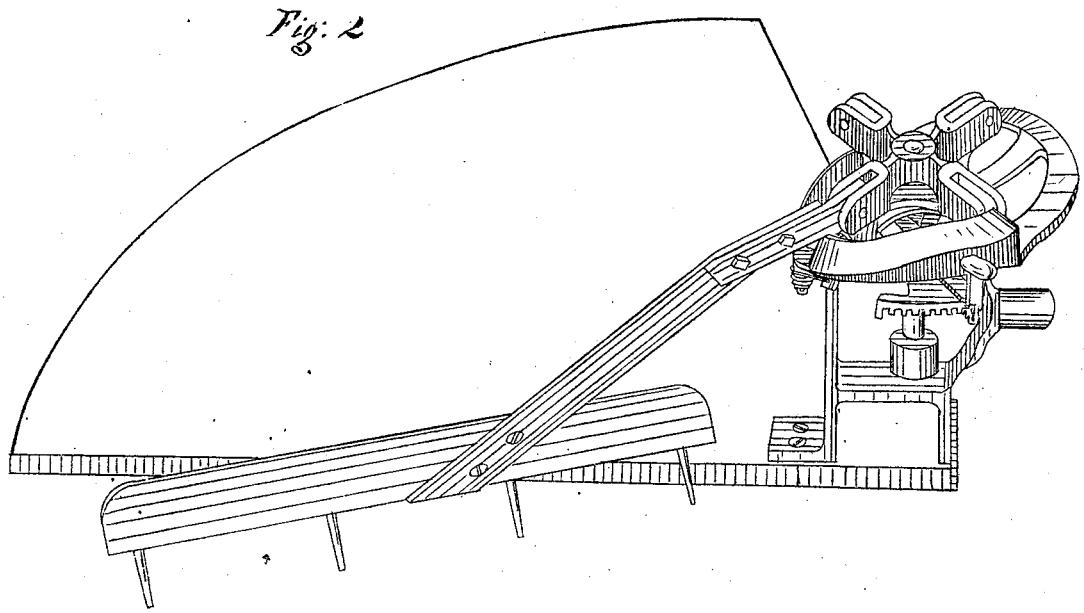

Figure 1 is a perspective view of my improvement. Fig. 2 is also a perspective view of same, showing the rake in a different position. Fig. 3 is a plan of same, corresponding to Fig. 1. Fig. 4 is a plan of same, corresponding to Fig. 2. Fig. 5 is a vertical section through center of reel-post. Fig. 6 is a perspective view of reel-post. Fig. 7 is a perspective view of rake-cam; Fig. 8, perspective view of rake-arm head; Fig. 9, perspective view of rear side cam and reel-post.

This invention relates to that class of harvesters known as "reel-rake machines."

Hitherto the cam or guide by which the rake and reel arms are controlled in their movements has always been secured either rigidly to the post, or it has been made adjustable by means of bolts with screw-nuts, which pass from the post through slots in the guide or cam. It is necessary to shift the position of the cam at times in order to regulate the stroke of the reel-blades or the rake, to accommodate different positions of the cutting apparatus or different conditions of the grain; but it has been impossible to make any change of the adjustment of the cam without stopping the machine, or without the employment of tools, the wrench, &c.

My invention consists in an adjustable cam-guide, always under control of the attendant, and capable of adjustment at any moment, and without stopping the machine.

That others may fully understand my invention, I will particularly describe the method of construction shown and its mode of operation.

A represents the platform, the front edge, to which the cutting apparatus is attached, being nearest to the spectator in Figs. 1 and 2.

At the inner front corner of the platform A the post or frame B is secured, and the cam-guide C is mounted upon the top of said post or frame. The cam C is provided with the usual switch and gate, by means of which the rake is caused to pass so far above the platform that it will not remove the cut grain therefrom.

The method of securing the cam-guide hitherto employed is shown in Fig. 9. The set-bolts *x y z* pass through slots in the web of the cam and into the post B. When said bolts are loosened the cam may be partially rotated, and the tightening of the bolts will secure it in the position desired.

When the grain varies in height in different portions of the field, it is necessary to change the adjustment of the cam frequently. To secure the best operation, the lowest point in the sweep of the rake should be farther forward for tall grain than for short grain. This adjustment in the field is troublesome, however, when the bolts *x y z* have to be loosened and secured again, because the machine has to be stopped, which entails a loss of time; but there is also danger of injury to the attendant if the team is restless. It is, therefore, of great advantage to secure the cam without the aid of screws, and in a manner which will permit the attendant to change the adjustment at any moment without stopping the machine or leaving his seat.

Hitherto the top of the frame or post B which supports the cam has usually been made flat, as shown in Fig. 9, and the web of the cam formed simply a plate with a central orifice for the passage of the reel-shaft, and several segmental slots for the tightening-bolts, so that the cam depended upon said bolts not only to hold it in position, but as guides when being rotated. I form at the top of post B a bearing or journal, O, and the web of the cam I provide with a hub, P, as shown in Figs. 5 and 7, and this hub is bored so as to fit the journal O, and it then becomes evident that when the cam is placed in position upon said bearing it will not only be held steadily, but will be capable of a free revolution upon the same as an axis; and in order to make it fully available for the purposes named, it will only be necessary to secure it from lifting off its bearing, and a holding device or latch by which it may be secured and held in position, as desired.

The reel-shaft *m* passes through the center of the hub P, as shown in Fig. 5, and at its lower end it is secured to a driving-pulley, (not shown,) by which the rake and reel receive motion from the driving mechanism, and at its upper end it is secured to the head D, to which the rake and reel arms are jointed. The head D rests upon the upper end of the journal O, and projects over the upper end of the hub P, so that the latter is securely retained in place, and prevented from rising off its seat.

A segmental rack, K, projects from the post B toward the frame of the machine, and the spring-latch R is secured to the cam C in a position which will permit said latch to engage with the rack K.

A lever, L, attached to the spring-latch R enables the attendant to disengage said latch, and to rotate the cam upon the journal O, and when the lever is released from the hand, the latch will engage with the teeth of the rack again, and hold the cam securely in its new position.

What I claim, and desire to secure by Letters Patent, is—

1. The cam-guide C, constructed to move freely upon a bearing, and provided with a stop-latch to hold it in position, so that it may be adjusted at the will of the attendant.

2. The arrangement of the cam-hub P and long bearing O in connection with the cam C, and a stop-latch to hold it in the desired position, substantially as set forth.

3. The arrangement of the long bearing-head O, cam-hub P, and rake-arm head D, to retain the cam in place without the aid of bolts, substantially as described.

4. The combination of the bearing-head O, stop-bracket K, cam C, and a latch device, to lock said arm in any desired position, substantially as described.

WILLIAM PIMLOTT.

Witnesses:
S. M. McCORD,
AUGUSTUS PETERS.